US009785837B2

(12) United States Patent
Mercier et al.

(10) Patent No.: US 9,785,837 B2
(45) Date of Patent: Oct. 10, 2017

(54) MEASURING ATMOSPHERIC ATTRIBUTES USING MULTISPECTRAL IMAGES

(71) Applicant: BAE SYSTEMS Information and Electronic Systems Integration Inc., Nashua, NH (US)

(72) Inventors: Michael N. Mercier, Nashua, NH (US); Joseph M. Schlupf, Newburyport, MA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 234 days.

(21) Appl. No.: 14/918,154

(22) Filed: Oct. 20, 2015

(65) Prior Publication Data

US 2016/0110582 A1    Apr. 21, 2016

Related U.S. Application Data

(60) Provisional application No. 62/066,422, filed on Oct. 21, 2014.

(51) Int. Cl.
    *G06K 9/66*    (2006.01)
    *G06K 9/00*    (2006.01)

(52) U.S. Cl.
    CPC . *G06K 9/0063* (2013.01); *G06K 2009/00644* (2013.01)

(58) Field of Classification Search
    None
    See application file for complete search history.

(56) References Cited

U.S. PATENT DOCUMENTS

| | | | | |
|---|---|---|---|---|
| 2004/0047518 | A1* | 3/2004 | Tiana | G06T 5/50 382/284 |
| 2010/0194851 | A1* | 8/2010 | Pasupaleti | H04N 1/3876 348/36 |
| 2011/0103692 | A1* | 5/2011 | Williams | G06T 5/20 382/190 |
| 2015/0195496 | A1* | 7/2015 | Hayakawa | B60R 1/00 348/118 |
| 2016/0132745 | A1* | 5/2016 | Falb | G06K 9/4604 348/148 |

* cited by examiner

*Primary Examiner* — Iman K Kholdebarin
(74) *Attorney, Agent, or Firm* — McCarter & English LLP

(57) ABSTRACT

A mechanism for determining atmospheric conditions from an image is described. A mechanism for determining atmospheric conditions includes determining an intensity value for pixels above and below the horizon in an image, calculating a slope between the intensity values for the pixels above the horizon, and a slope between the intensity values for the pixels below the horizon, and determining a difference between the slopes to determine the atmospheric conditions.

20 Claims, 18 Drawing Sheets

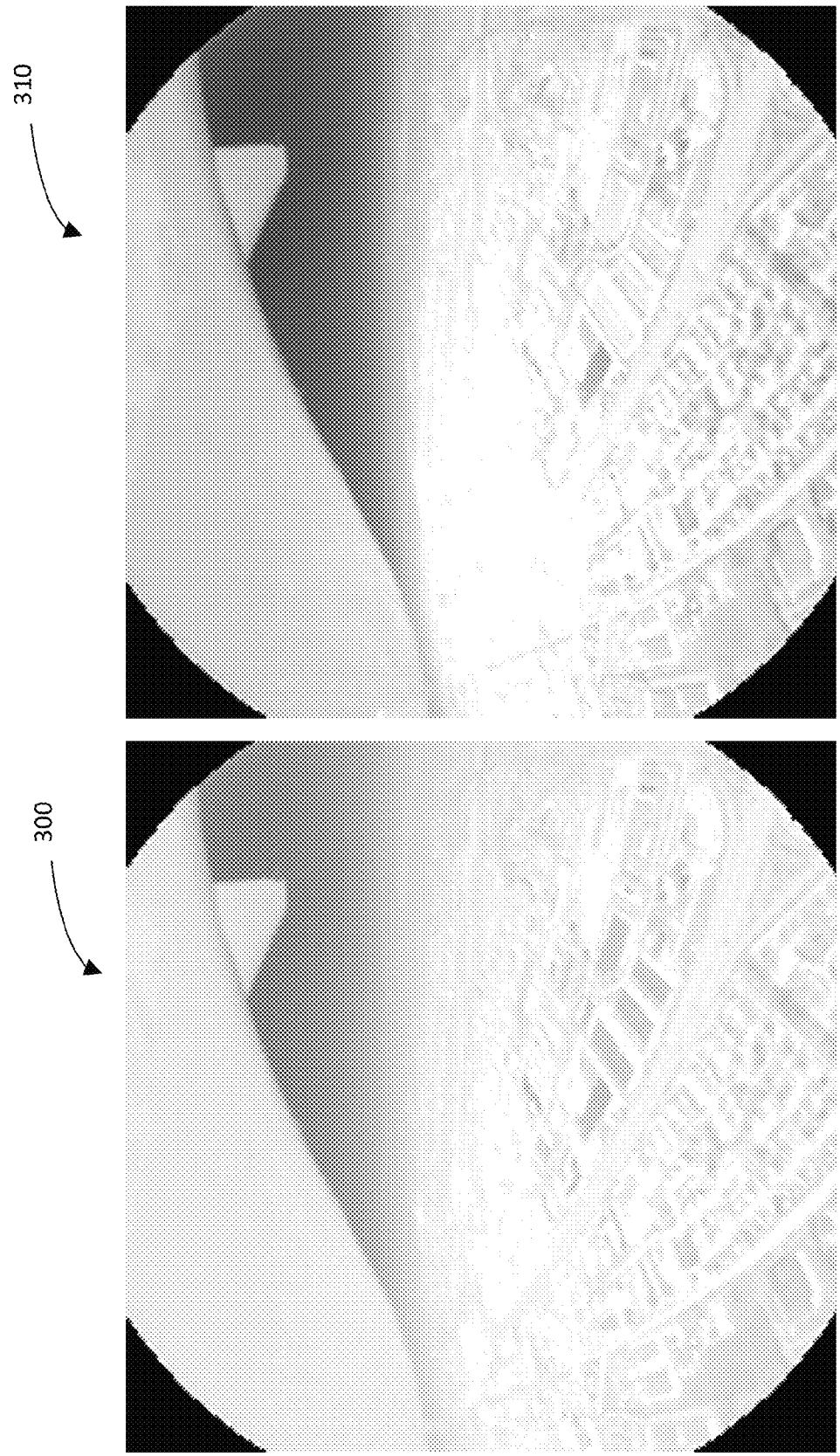

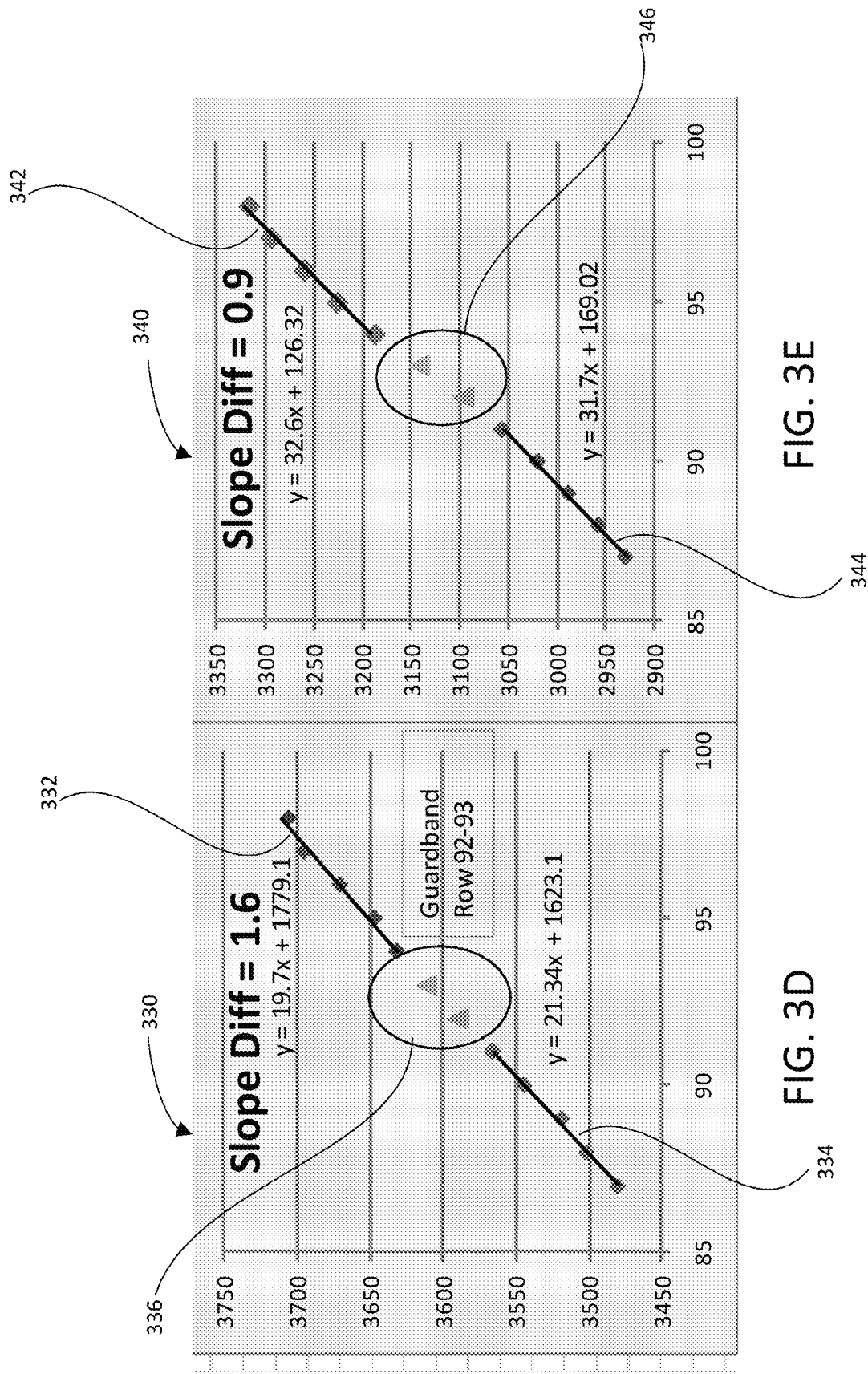

MEASURING ATMOSPHERIC ATTRIBUTES USING MULTISPECTRAL IMAGES

RELATED APPLICATION

This application claims benefit of and priority to U.S. Provisional Patent Application Ser. No. 62/066,422, filed Oct. 21, 2014, which is incorporated herein by reference in its entirety.

BACKGROUND

Imaging sensors are used to detect various objects. For example, optical sensors that are part of a threat detection system can be used to detect launched ordinance. Atmospheric conditions may have a significant effect on the intensity of the data perceived by optical sensors in such a threat detections system. Accordingly intensity thresholds in such threat detection systems may be calibrated based on atmospheric conditions.

SUMMARY

In one embodiment, a method for determining atmospheric conditions from an image includes identifying a set of pixels surrounding a horizon depicted in an image frame, the set of pixels including a plurality of rows in a first subset of pixels above the horizon and a plurality of rows in a second subset of pixels below the horizon. The method also includes determining an intensity value for each of the pixels, averaging the intensity values for each of a specified number of rows of the pixels in the first subset and the second subset, determining a slope of the averages of the first subset of pixels, and determining a slope of the averages of the second subset of pixels. A difference between the two slopes is calculated to determine atmospheric conditions.

In another embodiment, a system for determining atmospheric conditions from an image includes a memory and one or more processors in communication with the memory. The one or more processors are configured to identify a set of pixels surrounding a horizon depicted in an image frame, where the set of pixels includes a plurality of rows in a first subset of pixels above the horizon and a plurality of rows in a second subset of pixels below the horizon. The one or more processors are further configured to determine an intensity value for each of the pixels, average the intensity values for each of a specified number of rows of the pixels in the first subset and the second subset, calculate a slope of the averages of the first subset of pixels, and calculate a slope of the averages of the second subset of pixels. A difference between the two slopes is calculated to determine atmospheric conditions.

BRIEF DESCRIPTION OF THE DRAWINGS

The accompanying drawings, which are incorporated in and constitute a part of this specification, illustrate one or more embodiments of the invention and, together with the description, help to explain the invention. The embodiments are illustrated by way of example and should not be construed to limit the present disclosure. In the drawings

FIG. 3A depicts an exemplary red spectral band image from an imaging sensor in an embodiment;

FIG. 3B depicts an exemplary blue spectral band image from an imaging sensor in an embodiment;

FIG. 3D is an exemplary graph illustrating a slope between the average intensity values for pixels above the horizon and below the horizon in the red spectral band image of FIG. 3A;

FIG. 3E is an exemplary graph illustrating a slope between the average intensity values for pixels above the horizon and below the horizon in the blue spectral band image of FIG. 3B;

DETAILED DESCRIPTION

As noted above, one use of imaging sensors in a military setting is to detect launched ordinance as part of a threat detection system. To protect an asset, such as aerial vehicles having a host platform with an on-board imaging system, it is important to minimize false detections and accurately identify the type of threat detected by the system. Unfortunately, atmospheric conditions may interfere with efficient and accurate object detection from images, absorbing some portion of the intensity emitted by the threat. In other contexts, atmospheric sensors can often be used to sense the conditions of the atmosphere. However, atmospheric sensors are not always readily available on mobile and other threat detection systems and as a result, the detection systems cannot easily account for atmospheric conditions that interfere with object/threat detection.

A launched ordinance often emits spectral content and radiant intensity. Atmospheric conditions can impact the intensity perceived by imaging sensors in a threat detection system. Knowledge of atmospheric visibility conditions surrounding a host platform can aid in setting intensity thresholds required for accurate threat detection. However, host platforms are usually not equipped with atmospheric sensors and are not capable of measuring atmospheric conditions away from the aircraft.

According to exemplary embodiments, a system and method for determining atmospheric conditions is provided using passive imaging sensors to collect multispectral intensity data from rows of pixels surrounding a horizon depicted in an image frame captured by the imaging sensor. The intensity data from each row is averaged in each spectral band. Following this, two "buffer" rows located closest to the horizon are removed, and two data sets are plotted versus elevation angle for each spectral band wherein the first data set correlates to pixels above the horizon and the second data set correlates to pixels from below the horizon. A linear best-fit line may be applied to each data set, and the difference in slope between data sets of the same spectral band may be used to indicate an atmospheric condition. Higher slope differences are indicative of better visibility while lower slope differences are indicative of lower visibility. This atmospheric condition information allows the threat detection system to set appropriate thresholds and reduce the probability of false detections and missed threats.

A frame as used herein may refer to an image in a series of images or a still shot from a video clip or stream. A plurality of frames may be captured by an imaging sensor coupled to a host platform described below. The frame may be analyzed to detect objects and potential threats to the host platform. The frame, as used herein, is a multispectral image, including at least two spectral bands-a red spectral band and a blue spectral band.

Figure 1:
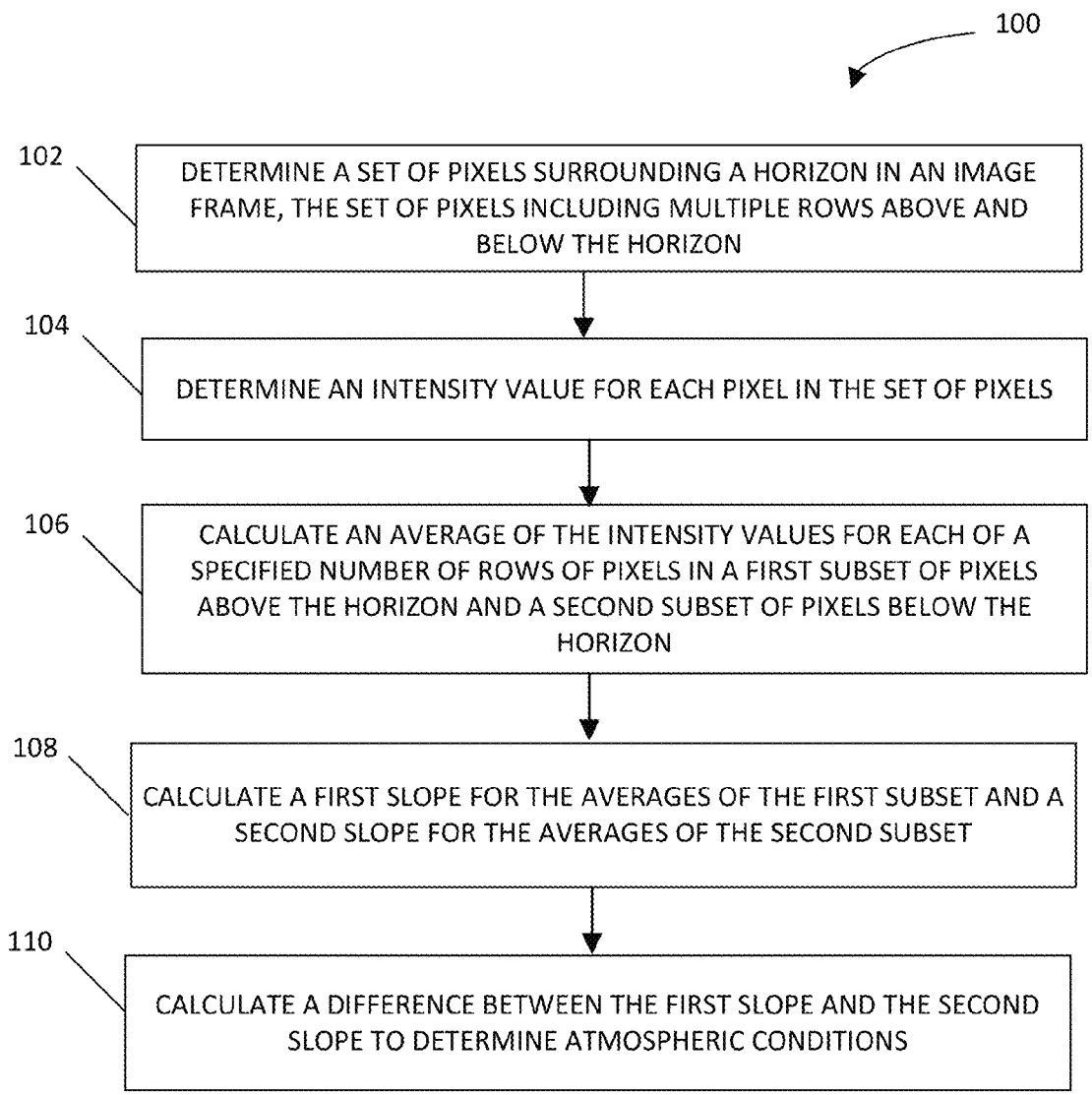
FIG. 1 is a system for measuring atmospheric attributes using multispectral images, according to an example embodiment.
Figure 2:
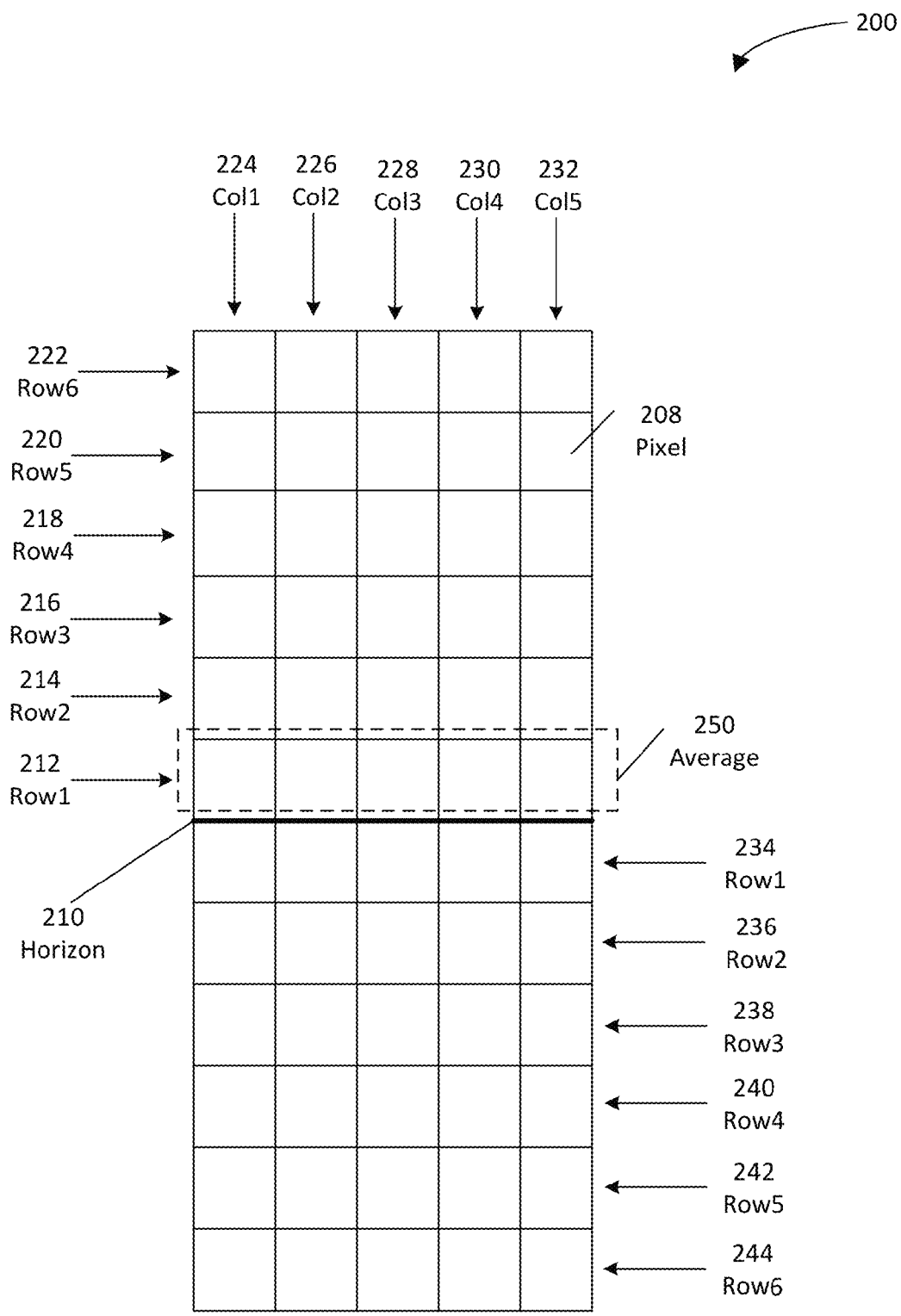
FIG. 2 is a flowchart for a method for measuring atmospheric attributes using multispectral images, according to an example embodiment.

FIG. 1 is a flowchart for an example method 100 for determining atmospheric conditions using images. FIG. 2 is a schematic depicting an example image 200 illustrated in terms of pixels 208 surrounding the horizon 210. The image 200 is described below along with the method 100 for ease of description.

The method 100 begins by selecting a set of pixels surrounding a horizon depicted in an image frame at step 102. The set of pixels includes a first subset of pixels with multiple rows above the horizon and a second subset of pixels with multiple rows below the horizon. As shown in example image 200, pixel rows 212, 214, 216, 218, 220, and 222 are above the horizon 210, and pixel rows 234, 236, 238, 240, 242, and 244 are below the horizon 210. In some embodiments, the method 100 may select these six rows above and six rows below the horizon as illustrated in FIG. 2. In some embodiments, the set of pixels includes five columns of pixels, as illustrated in FIG. 2 by columns 224, 226, 228, 230, and 232.

At step 104, the method 100 determines an intensity value for each pixel selected in step 102. At step 106, the method 100 calculates an average of the intensity values for each of a specified number of rows of pixels in the first subset and the second subset. For example, as illustrated in FIG. 2, the average 250 is calculated for row 212 by calculating the average of the intensity values of the pixels in row 212. The average is calculated for row 214 by calculating the average of the intensity values of the pixels in row 214. Similarly, the average is calculated for each row (row 216, row 218, row 220, row 222, row 234, row 236, row 238, row 240, row 242, and row 244) by calculating the average of the intensity values of the pixels in each respective row. These averages may be stored in a database as associated with its respective pixel row.

At step 108, the method 100 calculates a first slope between the averages of the intensity values for the rows in the first subset above the horizon. The method 100 also calculates a second slope between the averages of the intensity values for the rows in the second subset below the horizon. For example, the method 100 may determine a best fit line between the average of row 212, the average of row 214, the average of row 216, the average of row 218, the average of row 220 and the average of row 222, where the averages are calculated in step 106. The method 100 then determines the first slope as the slope of this best fit line for the calculated averages for the first subset of pixels above the horizon. Similarly, the method 100 may determine a separate best fit line between the average of row 234, the average of row 236, the average of row 238, the average of row 240, the average of row 242, and the average of row 244 where the averages are calculated in step 106. The method 100 then determines the second slope as the slope of this best fit line for the calculated averages for the second subset of pixels below the horizon.

At step 110, the method 100 further calculates a difference between the first slope and the second slope to determine atmospheric conditions. The pixel rows above the horizon indicate the portion of the image that consists of the atmosphere, while the pixel rows below the horizon indicate the portion of the image consists of the ground. At a given location, the second slope corresponding to the ground conditions remains substantially the same on any given day. However, at the given location the first slope corresponding to the atmospheric conditions changes on a day-to-day basis because of variations in atmospheric conditions, such as humidity and heat. The ground conditions are generally less impacted than the atmospheric conditions by environmental factors such as humidity and heat.

In this manner, calculating the difference between an atmospheric slope and a ground slope of the intensity values of the pixels in the image frame, provides an indication of atmospheric conditions that may affect detection of threats by the host platform. Moreover, taking the average of the intensity values of the pixels in rows surrounding the horizon provide a better estimate of the slopes.

In some embodiments, the image frame is a multispectral image frame, and the set of pixels are selected from a red spectral band of the multispectral image frame. In some embodiments, the image frame is a multispectral image frame, and the set of pixels are selected from a blue spectral band of the multispectral image frame.

In some embodiments, the two pixel rows closest to the horizon (one row above and one row below) are removed from analysis and calculations to provide a buffer in calculations that accounts for optical blur and NED errors. For example, in FIG. 2, in one embodiment, the averages for rows 212 and 232 adjacent to the horizon may be omitted from the calculation of the first and second slopes.

FIG. 3A depicts an example red spectral band image 300 from the imaging sensor at a particular location, for example location A. FIG. 3B depicts an example blue spectral band image 310 from the imaging sensor at location A.

Figure 3C:
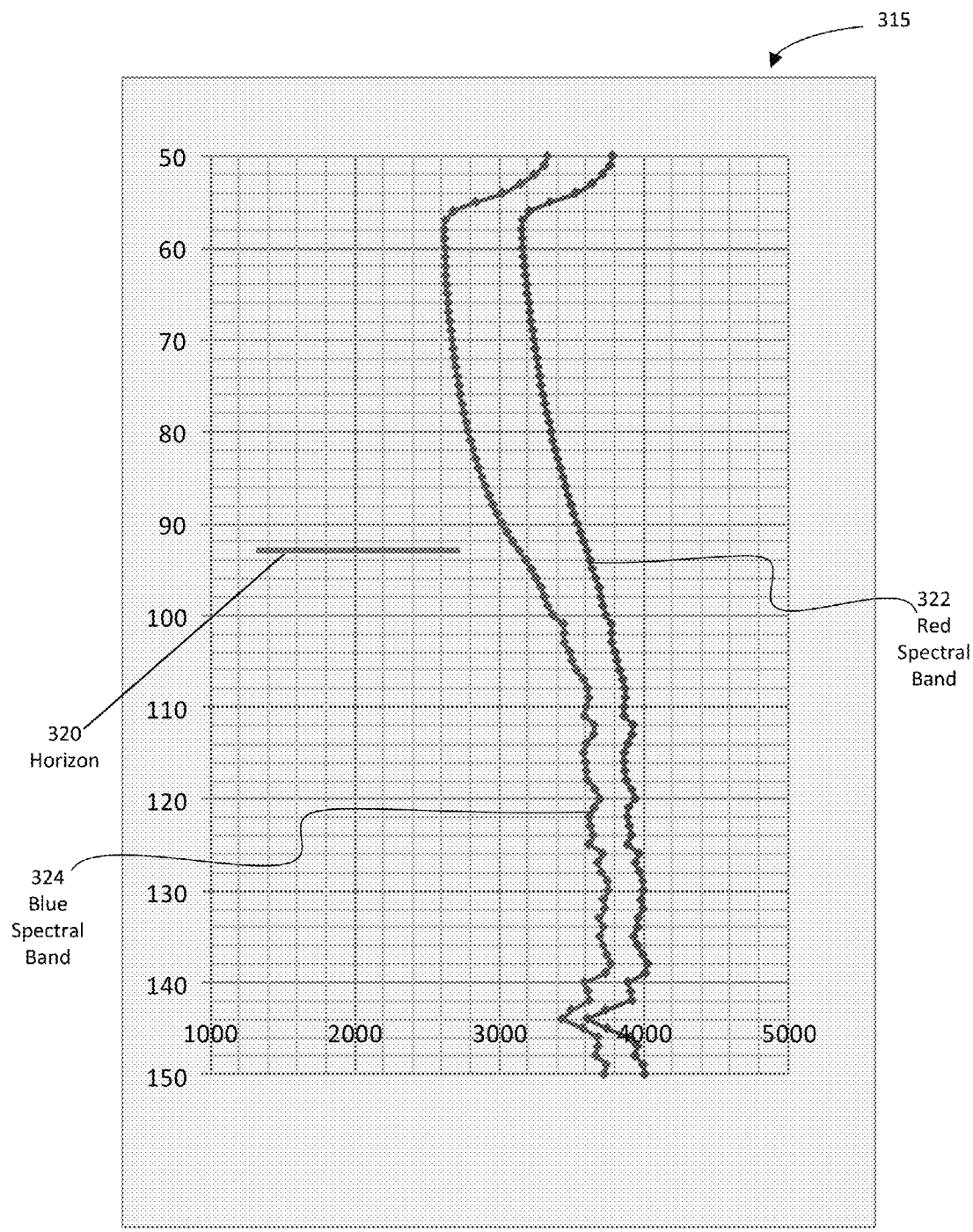
FIG. 3C is a graph illustrating average intensity values for pixels in multiple rows above the horizon and below the horizon in an exemplary embodiment.

FIG. 3C is a graph 315 illustrating average intensity values for pixels in multiple rows above the horizon and below the horizon depicted in images 300 and 310 at location A. The horizon 320 is located between pixel rows 90 and 95. The x-axis is the intensity value of the pixel. The best fit line 322 is the average intensity values from the red spectral band. The best fit line 324 is the average intensity values from the blue spectral band. As illustrated in FIG. 3C, a change in the average intensity values is realized above and below the horizon 320 at location A.

FIG. 3D is a graph 330 illustrating a slope between the average intensity values for pixels above the horizon and below the horizon in the red spectral band image of FIG. 3A. The first slope for pixels above the horizon is illustrated by the slope 332, and the second slope for pixels below the horizon is illustrated by the slope 334. The buffer pixels or rows is illustrated by data points 336.

FIG. 3E is a graph 340 illustrating a slope between the average intensity values for pixels above the horizon and below the horizon in the blue spectral band image of FIG. 3B. The first slope for pixels above the horizon is illustrated by the slope 342, and the second slope for pixels below the horizon is illustrated by the slope 344. The buffer pixels or rows is illustrated by data points 346.

Figure 4B:
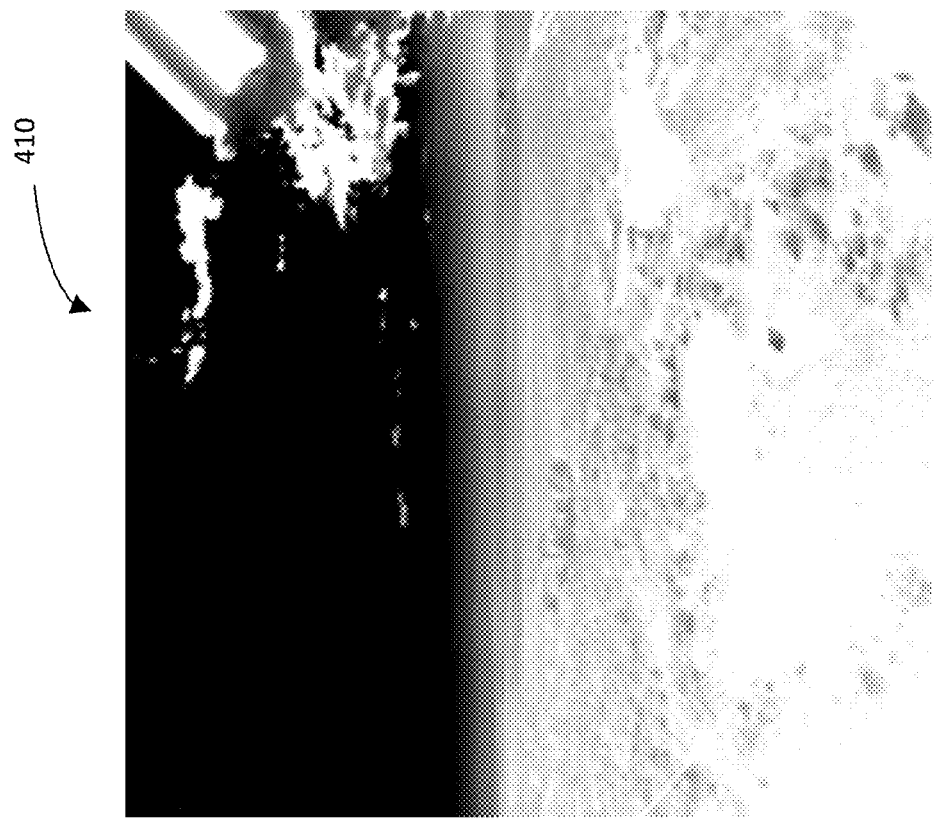
FIG. 4B depicts an exemplary blue spectral band image from an imaging sensor.
Figure 4A:
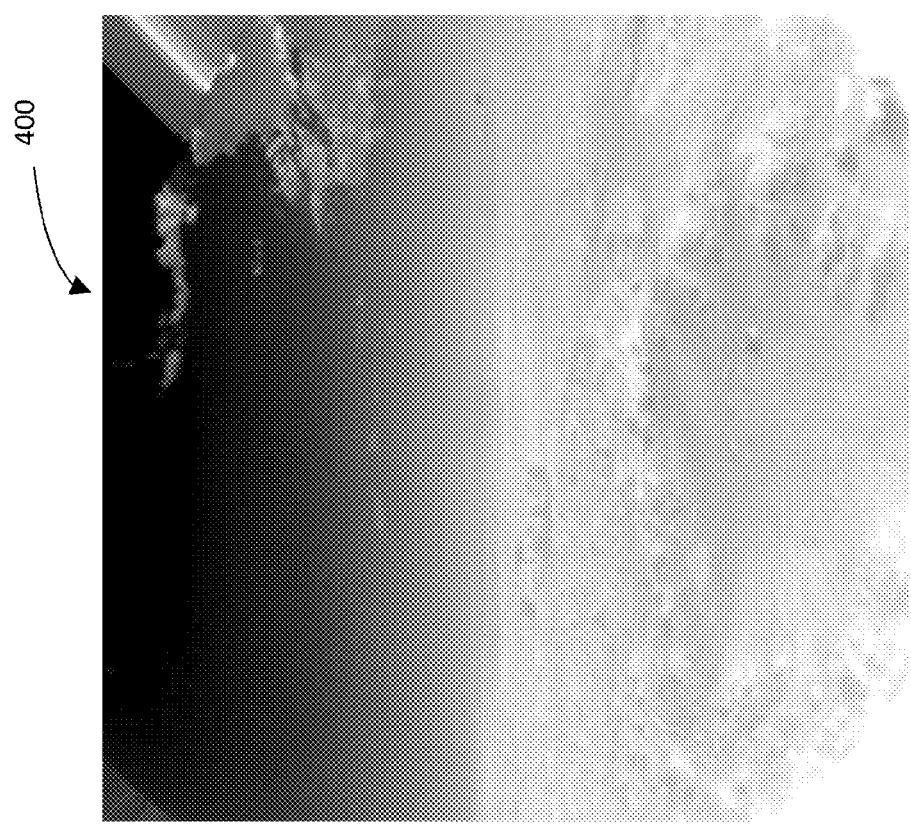
FIG. 4A depicts an exemplary red spectral band image from an imaging sensor.

FIG. 4A depicts an example red spectral band image 400 from the imaging sensor at a particular location, for example location B. FIG. 4B depicts an example blue spectral band image 410 from the imaging sensor at location B.

Figure 4C:
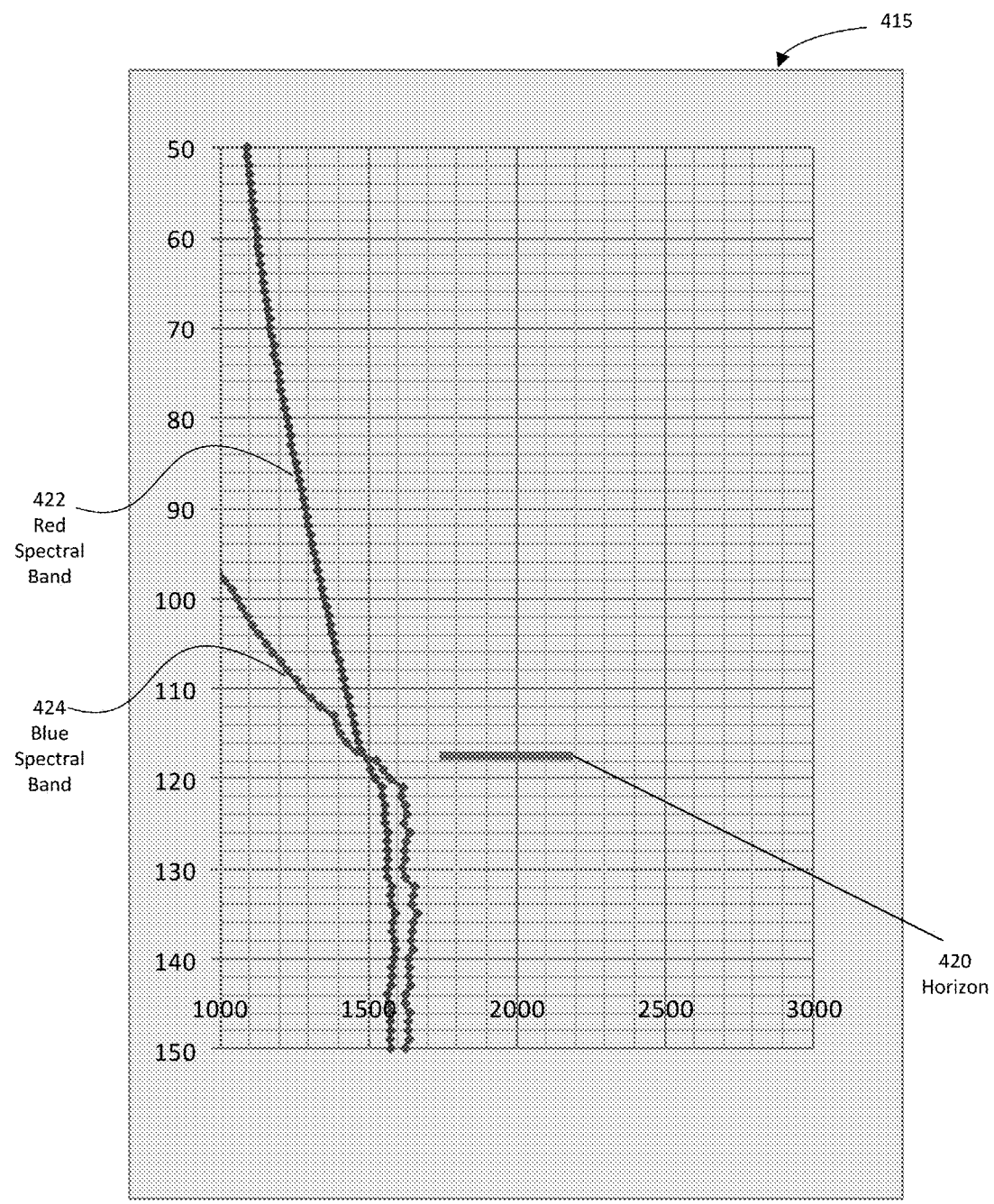
FIG. 4C is a graph illustrating average intensity values for pixels in multiple rows above the horizon and below the horizon in an exemplary embodiment.

FIG. 4C is a graph 415 illustrating average intensity values for pixels in multiple rows above the horizon and below the horizon depicted in images 400 and 410 at location B. The horizon 420 is located between pixel rows 115 and 120. The x-axis is the intensity value for the pixel. The best fit line 422 is the average intensity values from the red spectral band. The best fit line 424 is the average intensity values from the blue spectral band. As illustrated in FIG. 4C, a change in the average intensity values is realized above and below the horizon 420 at location B.

Figures 4D, 4E:
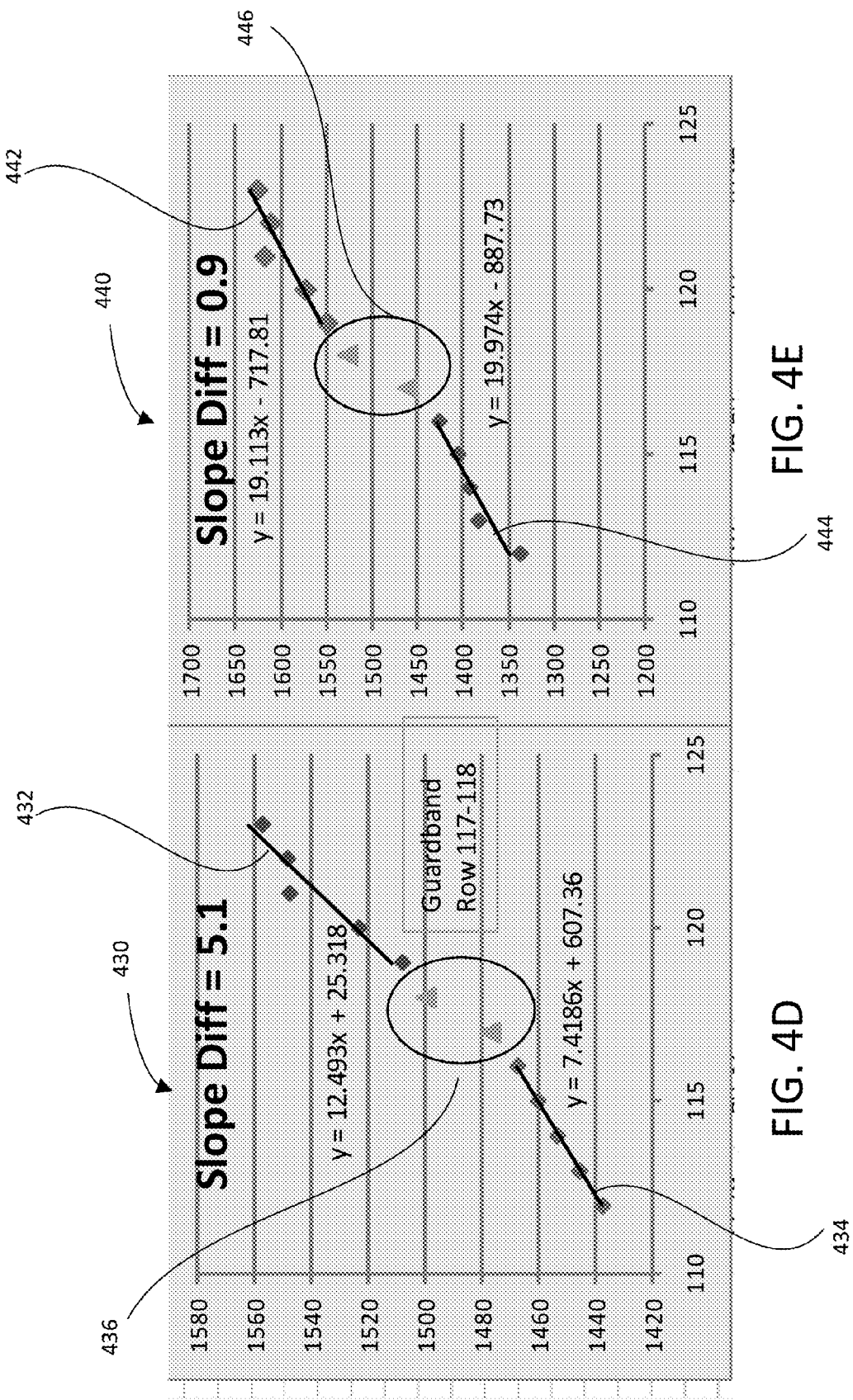
FIG. 4D is an exemplary graph illustrating a slope between the average intensity values for pixels above the horizon and below the horizon in the red spectral band image of FIG. 4A.
FIG. 4E is an exemplary graph illustrating a slope between the average intensity values for pixels above the horizon and below the horizon in the blue spectral band image of FIG. 4B.

FIG. 4D is a graph 430 illustrating a slope between the average intensity values for pixels above the horizon and below the horizon in the red spectral band image of FIG. 4A. The first slope for pixels above the horizon is illustrated by the slope 432, and the second slope for pixels below the horizon is illustrated by the slope 434. The buffer pixels or rows is illustrated by data points 436.

FIG. 4E is a graph 440 illustrating a slope between the average intensity values for pixels above the horizon and below the horizon in the blue spectral band image of FIG. 4B. The first slope for pixels above the horizon is illustrated by the slope 442, and the second slope for pixels below the horizon is illustrated by the slope 444. The buffer pixels or rows is illustrated by data points 446.

Figure 5B:
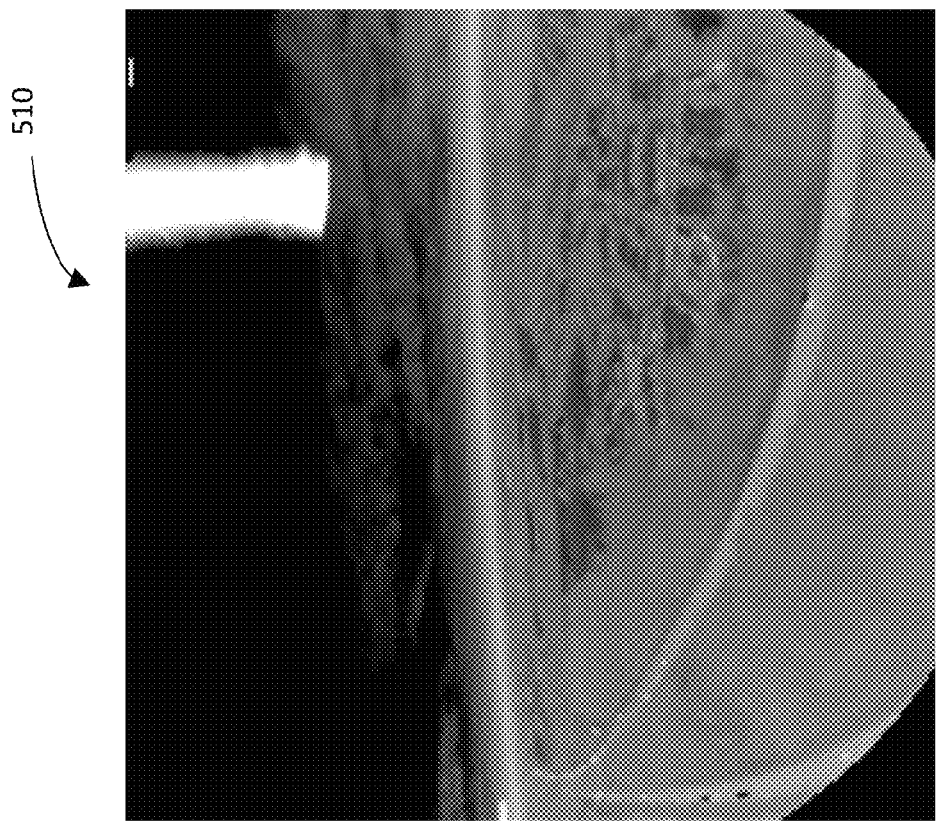
FIG. 5B depicts an exemplary blue spectral band image from an imaging sensor.
Figure 5A:
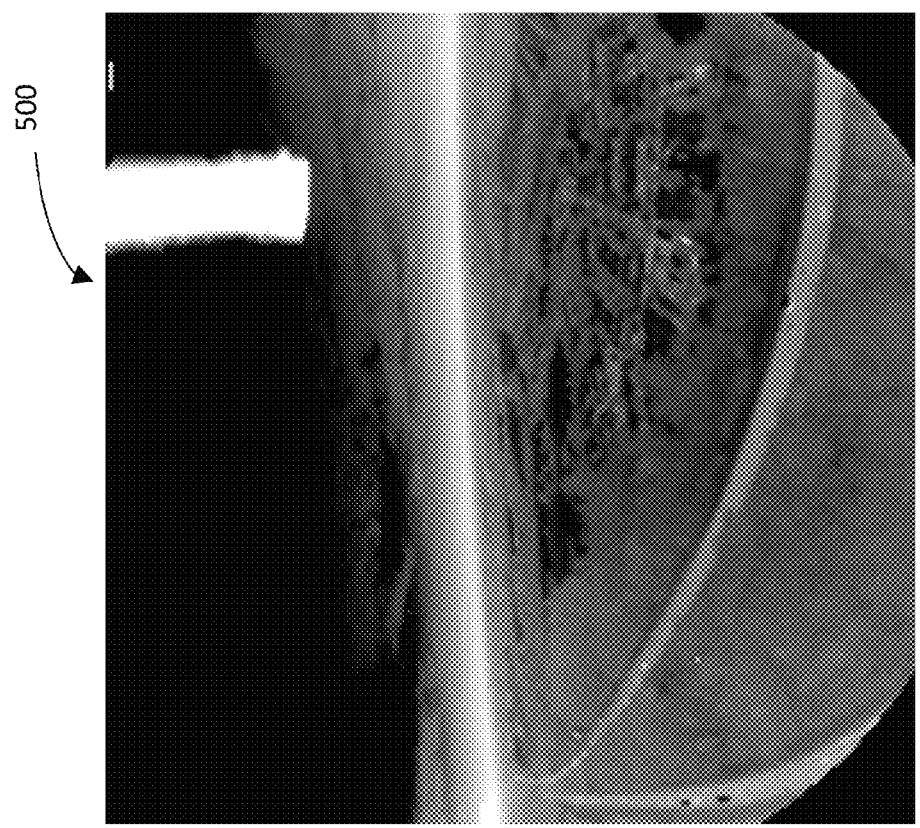
FIG. 5A depicts an exemplary red spectral band image from an imaging sensor.

FIG. 5A depicts an example red spectral band image 500 from the imaging sensor at a particular location, for example location C. FIG. 5B depicts an example blue spectral band image 510 from the imaging sensor at location C.

Figure 5C:
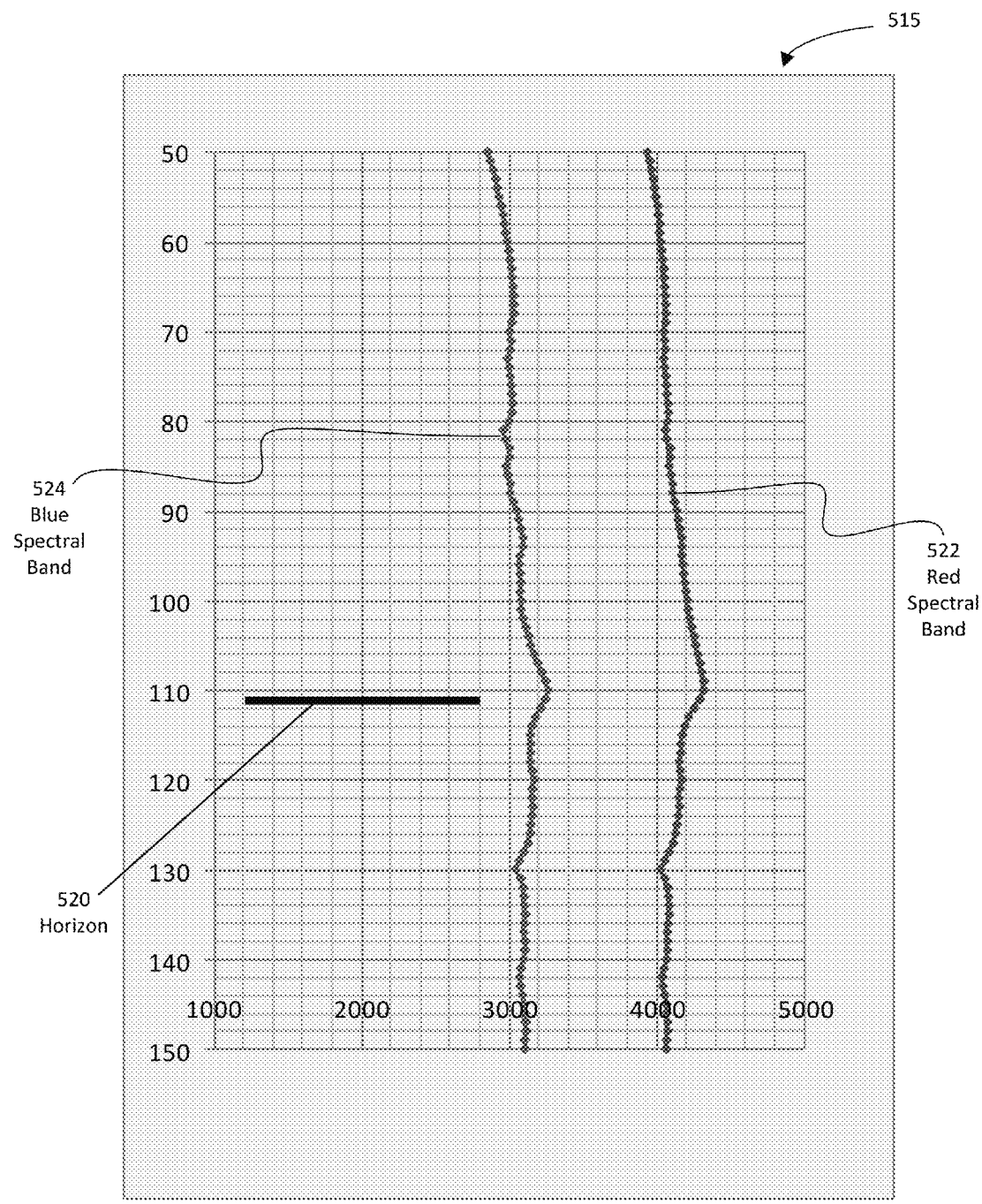
FIG. 5C is a graph illustrating average intensity values for pixels in multiple rows above the horizon and below the horizon in an exemplary embodiment.

FIG. 5C is a graph 515 illustrating average intensity values for pixels in multiple rows above the horizon and below the horizon depicted in images 500 and 510 at location C. The horizon 520 is located between pixel rows 110 and 115. The x-axis is the intensity value for the pixel. The best fit line 522 is the average intensity values from the red spectral band. The best fit line 524 is the average intensity values from the blue spectral band. As illustrated in FIG. 5C, a change in the average intensity values is realized above and below the horizon 520 at location C.

Figures 5D, 5E:
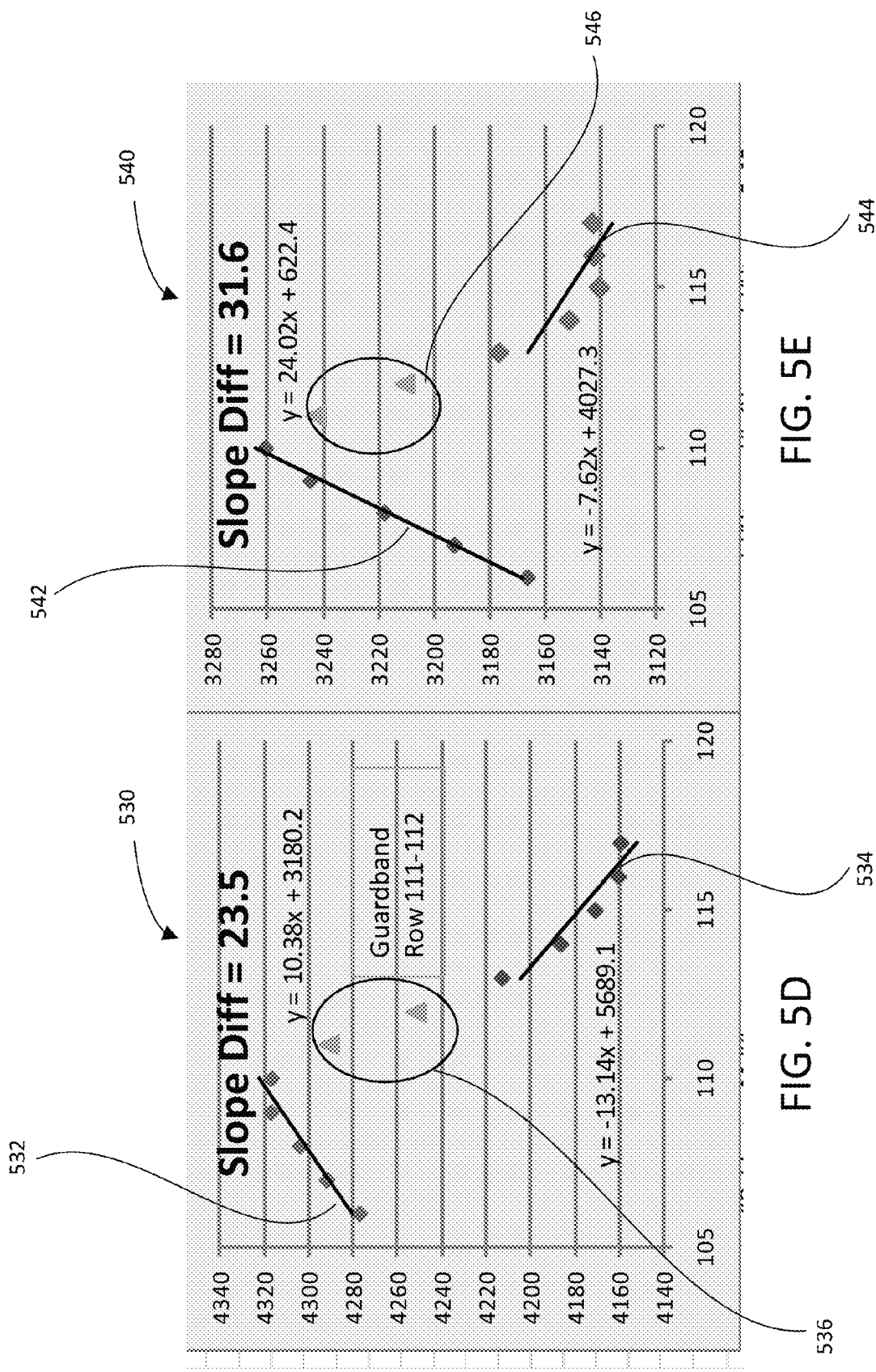
FIG. 5D is an exemplary graph illustrating a slope between the average intensity values for pixels above the horizon and below the horizon in the red spectral band image of FIG. 5A.
FIG. 5E is an exemplary graph illustrating a slope between the average intensity values for pixels above the horizon and below the horizon in the blue spectral band image of FIG. 5B.

FIG. 5D is a graph 530 illustrating a slope between the average intensity values for pixels above the horizon and below the horizon in the red spectral band image of FIG. 5A. The first slope for pixels above the horizon is illustrated by the slope 532, and the second slope for pixels below the horizon is illustrated by the slope 534. The buffer pixels or rows is illustrated by data points 536.

FIG. 5E is a graph 540 illustrating a slope between the average intensity values for pixels above the horizon and below the horizon in the blue spectral band image of FIG. 5B. The first slope for pixels above the horizon is illustrated by the slope 542, and the second slope for pixels below the horizon is illustrated by the slope 544. The buffer pixels or rows is illustrated by data points 546.

Figure 6B:
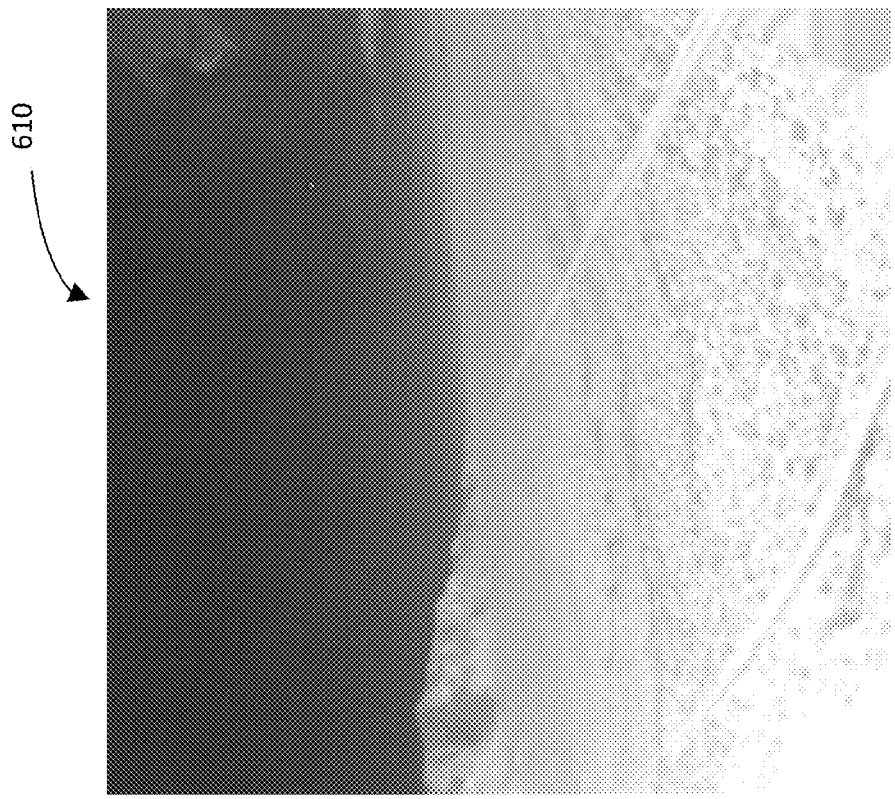
FIG. 6B depicts an exemplary blue spectral band image from an imaging sensor.
Figure 6A:
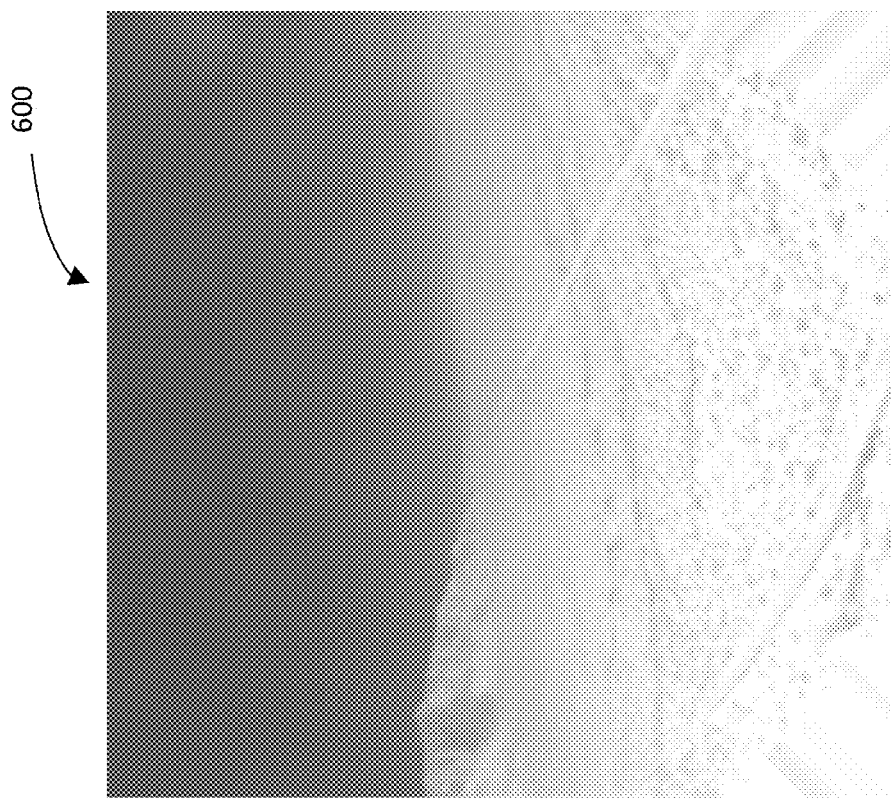
FIG. 6A depicts an exemplary red spectral band image from an imaging sensor.

FIG. 6A depicts an example red spectral band image 600 from the imaging sensor at a particular location, for example location D. FIG. 6B depicts an example blue spectral band image 610 from the imaging sensor at location D.

Figure 6C:
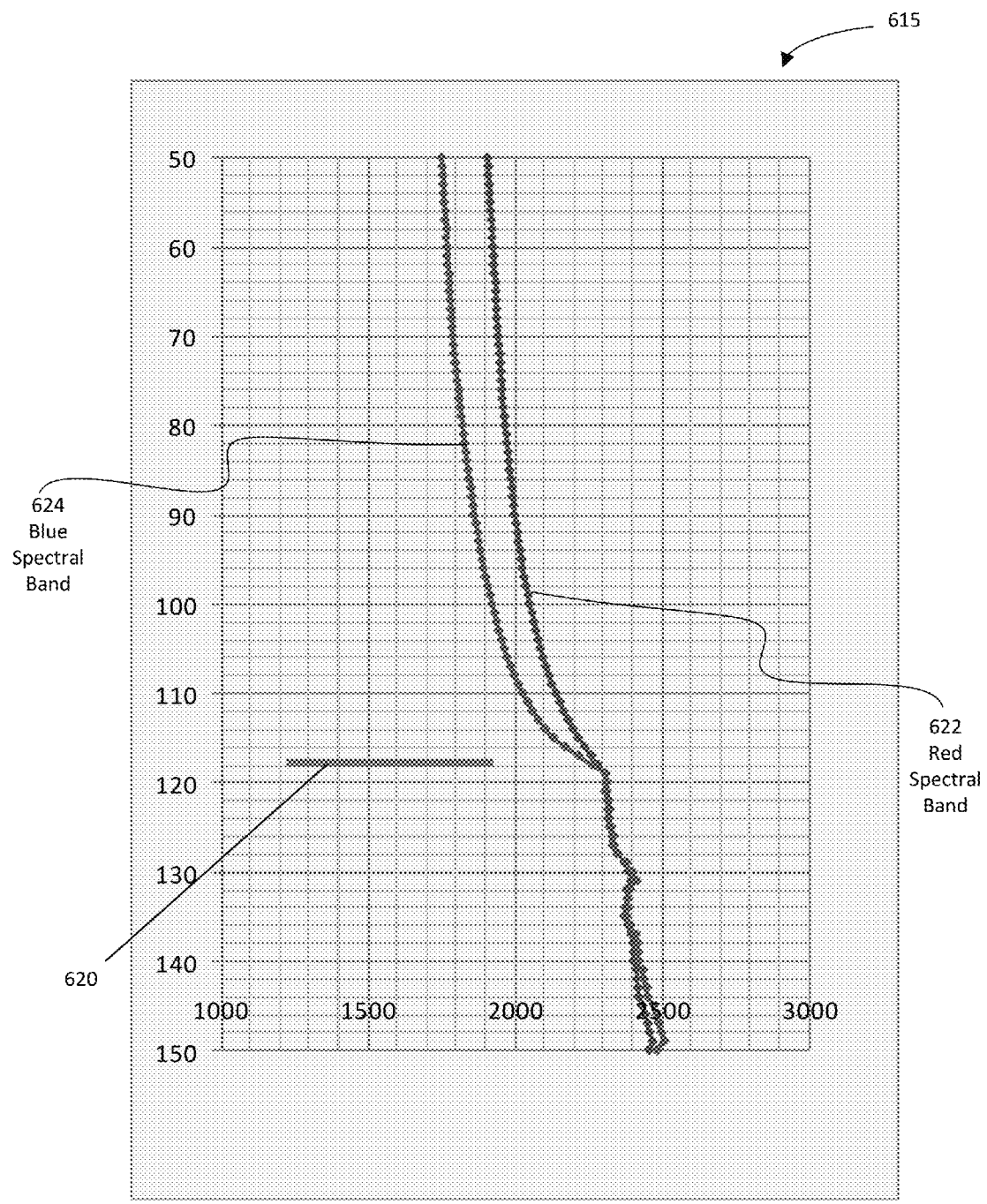
FIG. 6C is a graph illustrating average intensity values for pixels in multiple rows above the horizon and below the horizon in an exemplary embodiment.

FIG. 6C is a graph 615 illustrating average intensity values for pixels in multiple rows above the horizon and below the horizon depicted in images 600 and 610 at location D. The horizon 620 is located between pixel rows 115 and 120. The x-axis is the intensity value of the pixel. The best fit line 622 is the average intensity values from the red spectral band. The best fit line 624 is the average intensity values from the blue spectral band. As illustrated in FIG. 6C, a change in the average intensity values is realized above and below the horizon 620 at location D.

Figures 6D, 6E:
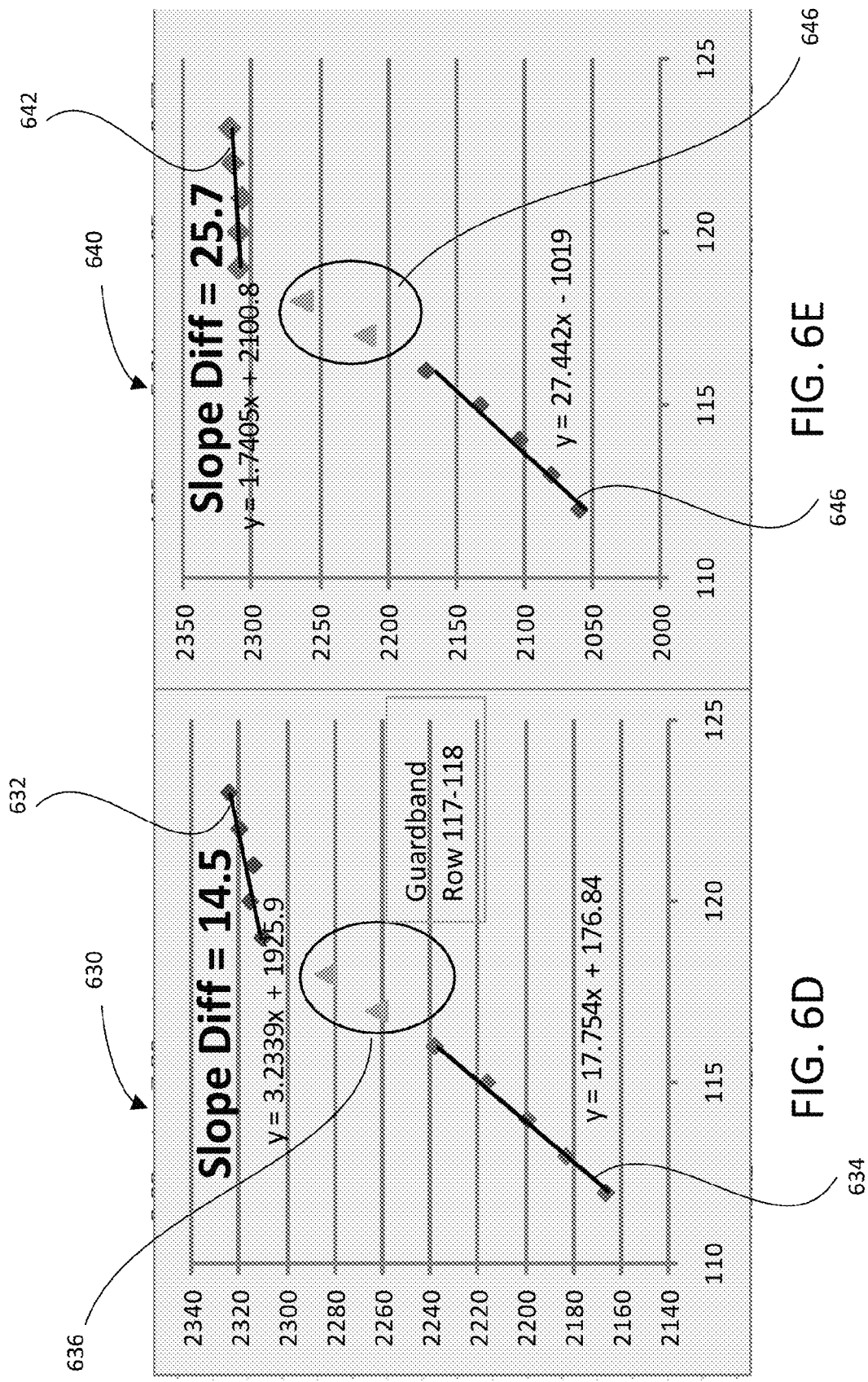
FIG. 6D is an exemplary graph illustrating a slope between the average intensity values for pixels above the horizon and below the horizon in the red spectral band image of FIG. 6A.
FIG. 6E is an exemplary graph illustrating a slope between the average intensity values for pixels above the horizon and below the horizon in the blue spectral band image of FIG. 6B.

FIG. 6D is a graph 630 illustrating a slope between the average intensity values for pixels above the horizon and below the horizon in the red spectral band image of FIG. 6A. The first slope for pixels above the horizon is illustrated by the slope 632, and the second slope for pixels below the horizon is illustrated by the slope 634. The buffer pixels or rows is illustrated by data points 636.

FIG. 6E is a graph 640 illustrating a slope between the average intensity values for pixels above the horizon and below the horizon in the blue spectral band image of FIG. 6B. The first slope for pixels above the horizon is illustrated by the slope 642, and the second slope for pixels below the horizon is illustrated by the slope 644. The buffer pixels or rows is illustrated by data points 646.

Figure 7:
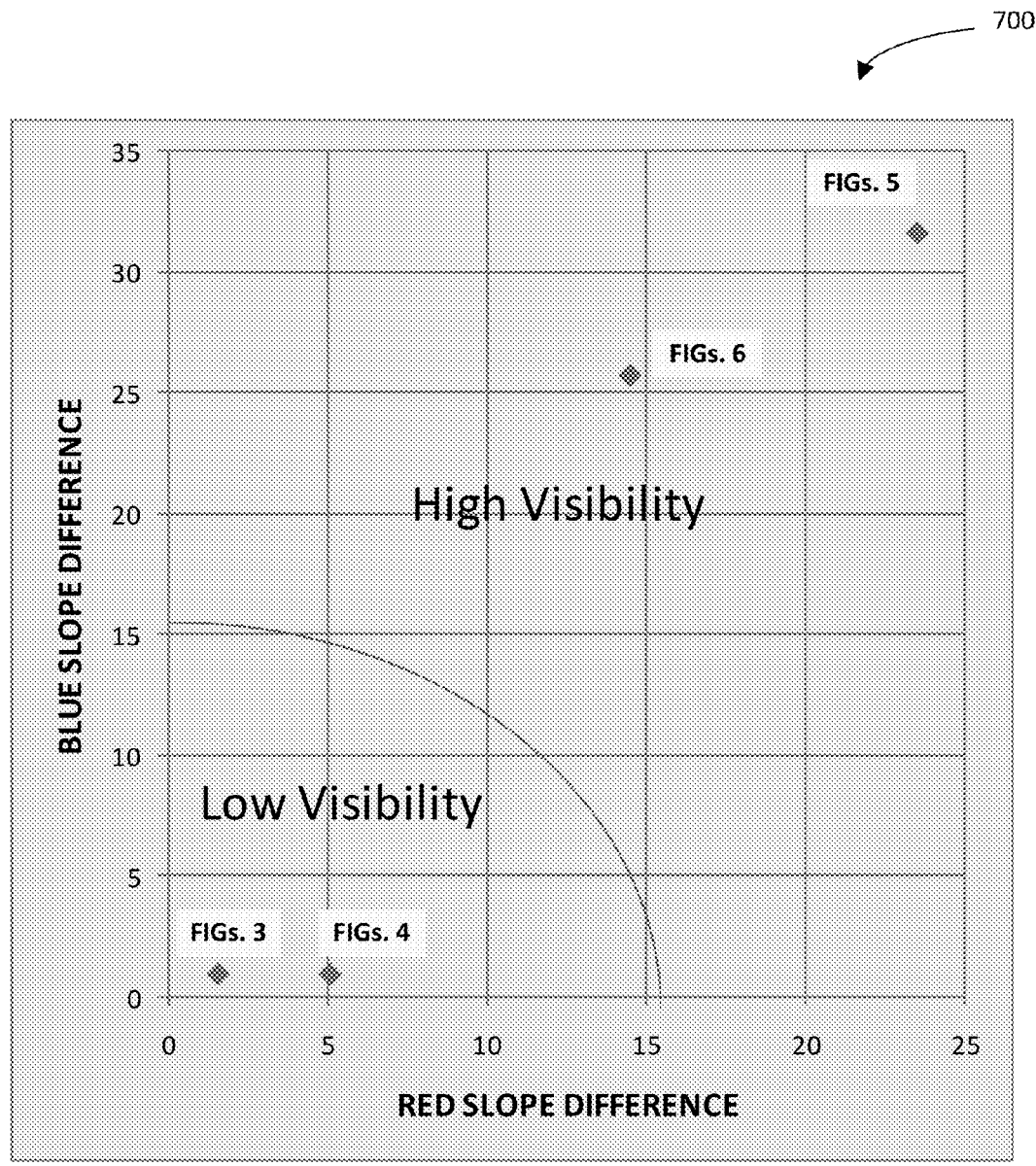
FIG. 7 is graph illustrating low and high atmospheric visibility conditions as evaluated by exemplary embodiments described herein.

FIG. 7 is graph 700 illustrating low and high atmospheric visibility conditions as evaluated using images described in relation to FIGS. 3-6. As illustrated in FIG. 7, the images used in FIGS. 5 and 6 have higher visibility than the images used in FIGS. 3 and 4. Higher slope differences, as demonstrated by FIG. 7, are indicative of better visibility while lower slope differences are indicative of lower visibility.

Figure 8:
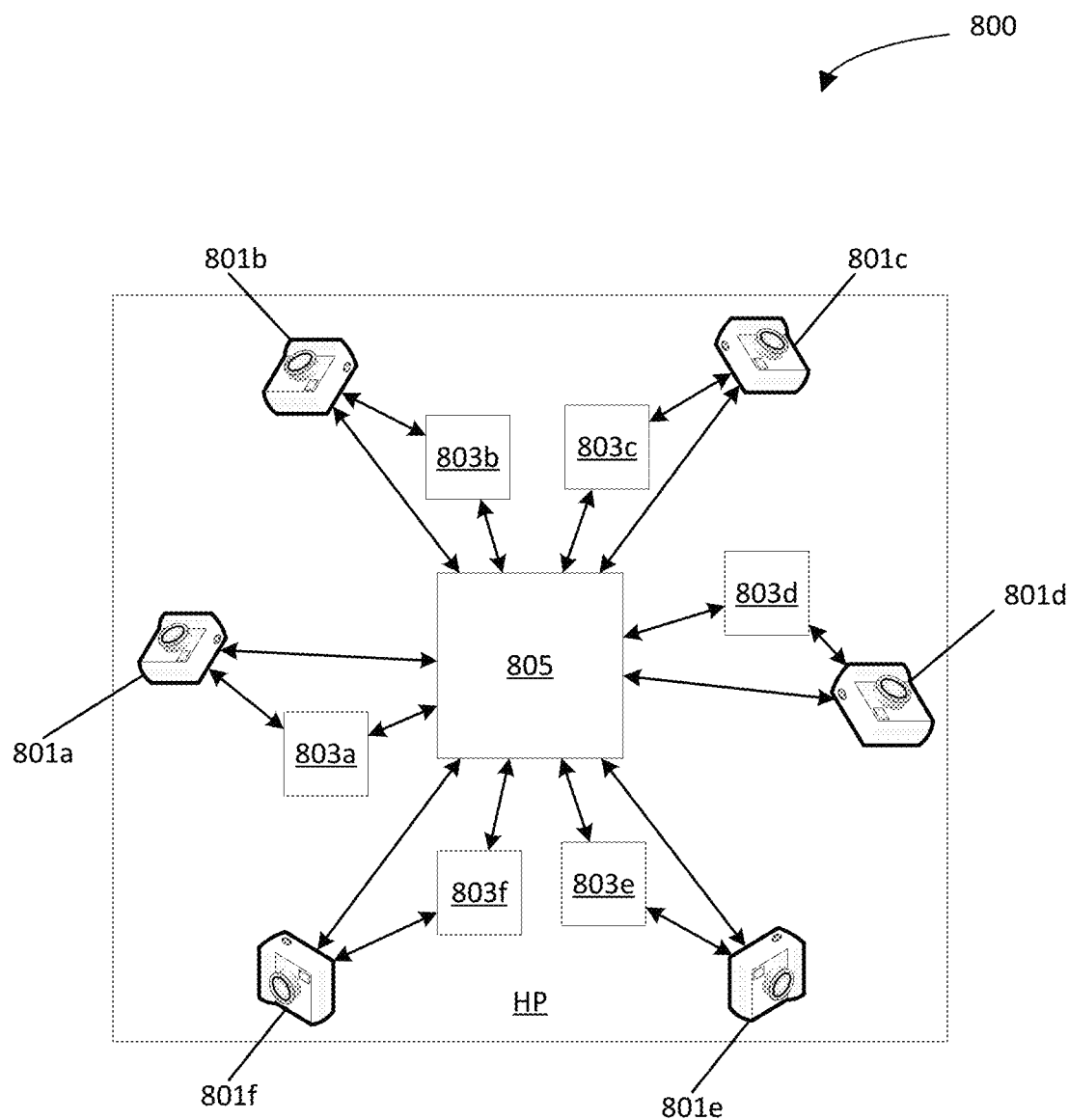
FIG. 8 is a block diagram depicting a system for a distributed on-board imaging system that can be used to implement exemplary embodiments described herein for measuring atmospheric attributes using multispectral images.

FIG. 8 is a block diagram depicting a system 800 for a distributed on-board imaging system that can be used to implement exemplary embodiments for measuring atmospheric conditions using images described herein. The on-board imaging system 800 can be installed on a host platform (HP). In one embodiment HP may be a fixed wing airplane, helicopter, drone or other vehicle capable of flight. The system 800 includes a plurality of image sensors 801a-f installed on the HP, each of the image sensors 801a-f being in electronic communication with at least one processor 803a-f, 805 installed on the HP. As shown in FIG. 8, each image sensor 801a-f is in electronic communication with both a dedicated processor 803a-f and a central processor 805. However, it will be apparent in view of this disclosure that, in accordance with various embodiments, one or more of the image sensors 801a-f can connect exclusively to a central processor 805. It will further be apparent in view of this disclosure that, in accordance with various embodiments, one or more of the image sensors 801a-f can connect exclusively to a dedicated processor 803a-f. It will still further be apparent in view of this disclosure that any combination of sensors per processor or processors per sensor can be used in accordance with various embodiments.

Image sensors 801a-f can be any suitable device such as, for example but not limited to, digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof. It will be apparent in view of this disclosure that image sensors 801a-f, in accordance with various embodiments can encompass any sensor configured to capture electromagnetic radiation in any spectrum for producing an image, including, for example, infrared radiation, visible light, ultraviolet radiation, x-rays, etc.

Dedicated processors 803a-f and central processor 805 can each include, for example, one or more field-programmable gate arrays (FPGA), microprocessors, application specific integrated circuits, integrated circuits, monolithic integrated circuits, microchips, programmable logic devices, complex programmable logic devices, any other suitable processing devices, or combinations thereof. For example, in some embodiments, each dedicated processor 803a-f can be a FPGA for providing temporary storage of a limited number of data captures acquired by the a corresponding image sensor 801a-f and a coarse initial analysis while the central processor 805 can be a microprocessor for conducting more detailed analysis as needed. In various embodiments, the central processor 805 can perform all processing functions, eliminating the need for dedicated processors 803a-f. In various embodiments, the dedicated processors 803a-f can perform all processing functions, eliminating the need for a central processor 805. It will be apparent in view of this disclosure that any other combinations and ratios of processors and image sensors can be used in accordance with various embodiments.

Figure 9:
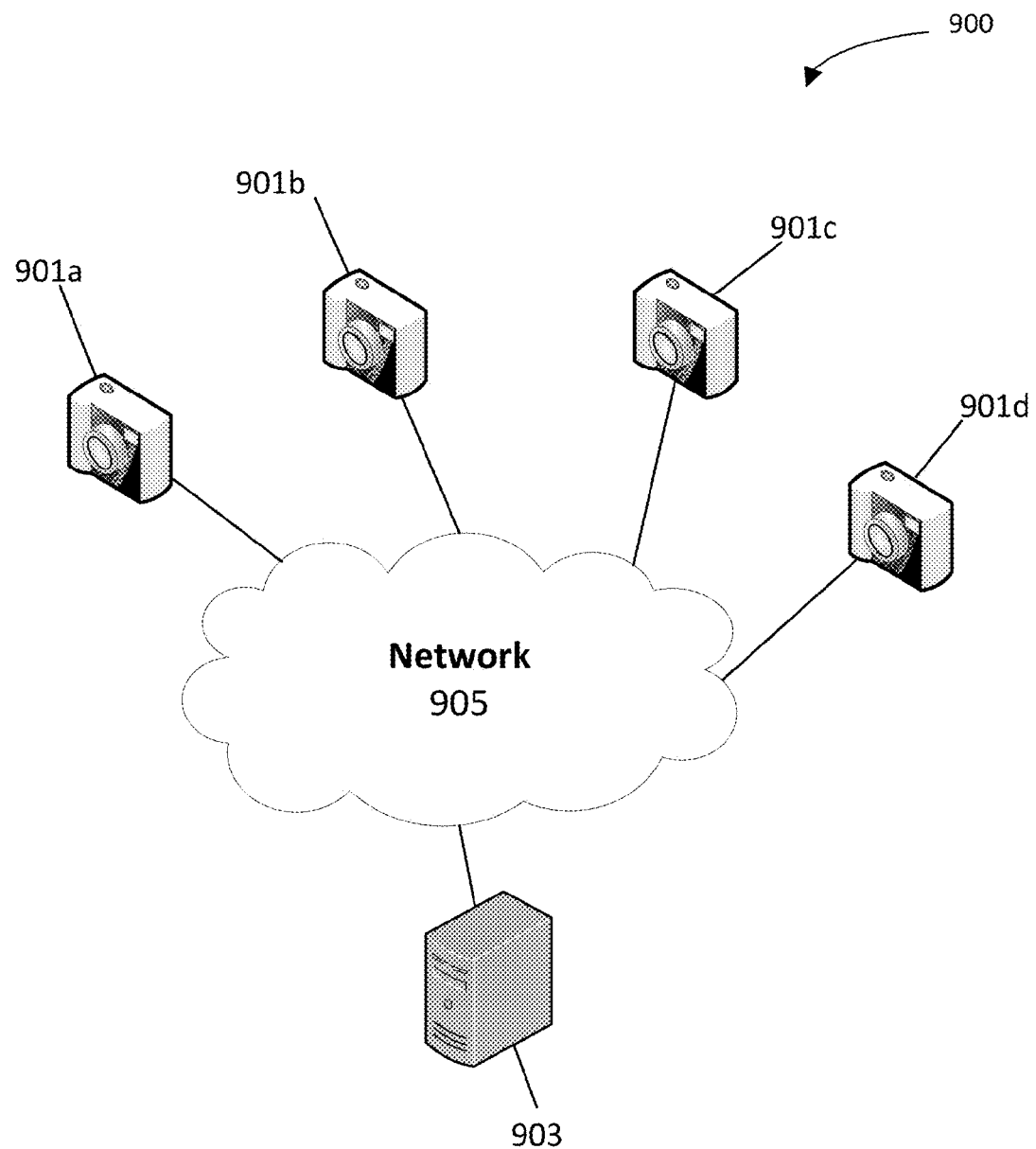
FIG. 9 is a block diagram depicting a distributed imaging system that can be used to implement exemplary embodiments described herein for measuring atmospheric attributes using multispectral images.

FIG. 9 is a block diagram depicting a distributed imaging system 900 that can be used to implement exemplary embodiments for measuring atmospheric conditions using images described herein. Although FIGS. 1 and 9 and portions of the exemplary discussion above, make reference to a centralized system 100, 900 operating with on one or more co-located image sensors and/or processors, one will recognize that various of the components and modules within the system 100, 900 may instead be distributed across a network 905 in separately or remotely located image sensors 901a-d such as digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof and processing systems 903 such as one or more server systems, desktop computer devices, mobile computer devices, field-programmable gate arrays, microprocessors, application specific integrated circuits, integrated circuits, monolithic integrated circuits, microchips, programmable logic devices, complex programmable logic devices, any other suitable processing devices, or combinations thereof. As one example, data captures acquired by the image sensors 901a-d can be received by the remote processing system(s) 903. In some embodiments, the remote processing system(s) 903 can provide feedback to one or more of the image sensors 901a-d. In some distributed remote imaging systems, the image sensors 901a-d and processing systems 903 of the system 100, 800 can be separately located and can be in communication with one another across the network 905.

Figure 10:
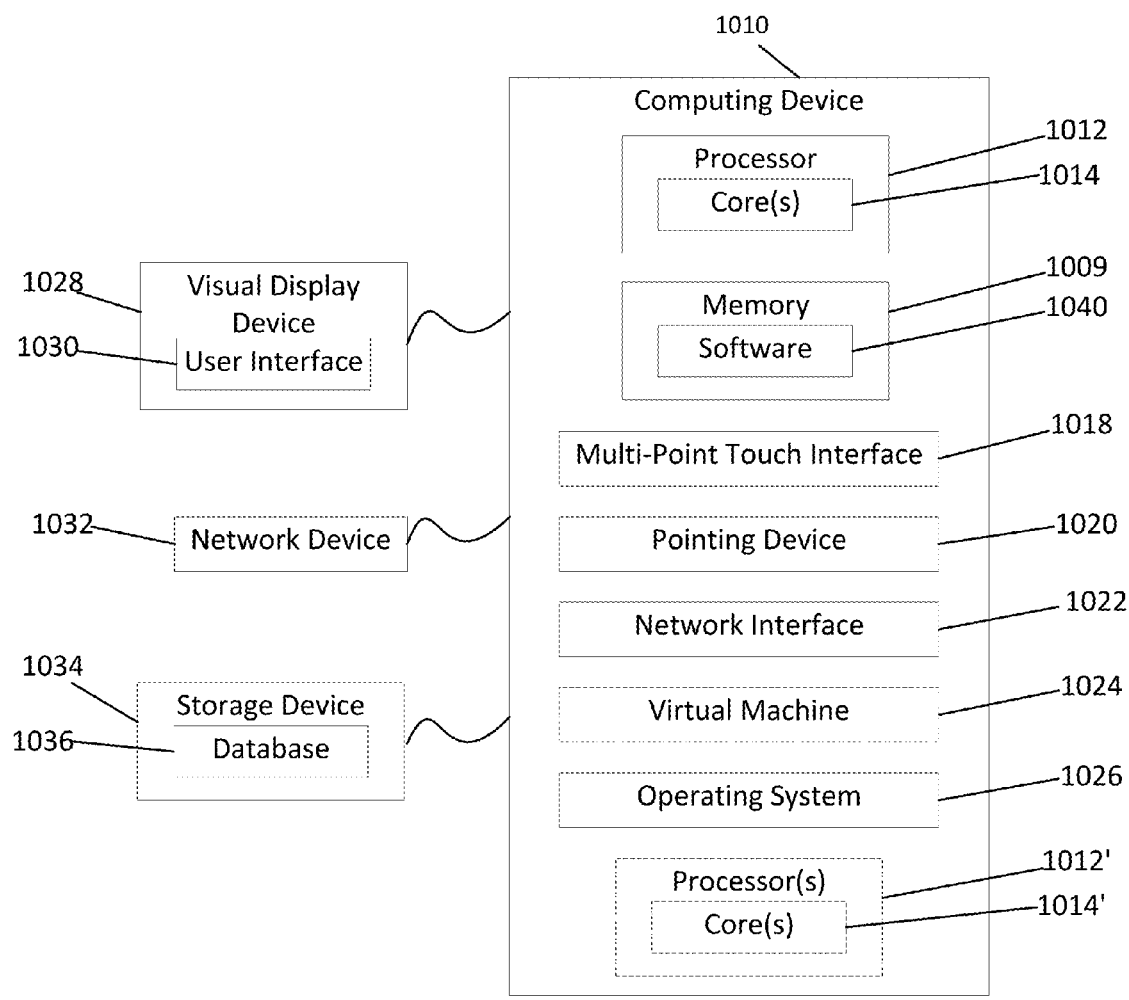
FIG. 10 is a block diagram of an exemplary computing device that can be used to implement exemplary embodiments for measuring atmospheric attributes using multispectral images described herein.

FIG. 10 is a block diagram of an exemplary computing device 1010 as can be used herein, or portions thereof, in accordance with various embodiments for measuring atmospheric conditions from images described herein. The computing device 1010 can include one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 1009 included in the computing device 1010 can store computer-readable and computer-executable instructions or software for performing the operations disclosed herein. For example, the memory 1009 can store a software application 1040 which is configured to perform various of the disclosed operations (e.g., determining a set of pixels, calculating an average of intensity values, determining a slope between the averages, etc.). The computing device 1010 can also include configurable and/or programmable processor 1012 and an associated core 1014, and one or more additional configurable and/or programmable processing devices, e.g., processor(s) 1012' and associated core(s) 1014' (for example, in the case of computational devices having multiple processors/cores), for executing computer-readable and computer-executable instructions or software stored in the memory 1009 and other programs for controlling system hardware. Processor 1012 and processor(s) 1012' can each be a single core processor or multiple core (1014 and 1014') processor. In some embodiments, processor 1012 and processor(s) 1012' can each be one or more of a field-programmable gate array (FPGA), a microprocessor, an application specific integrated circuit, integrated circuit, a monolithic integrated circuit, a microchip, a programmable logic device, a complex programmable logic device, any other suitable processing device, or combinations thereof.

Virtualization can be employed in the computing device 1010 so that infrastructure and resources in the computing device can be shared dynamically. A virtual machine 1024 can be provided to handle a process running on multiple processors so that the process appears to be using only one computing resource rather than multiple computing resources. Multiple virtual machines can also be used with one processor.

Memory 1009 can include a computational device memory or random access memory, such as DRAM, SRAM, EDO RAM, and the like. Memory 1009 can also include, for example, flip-flops, memory blocks, RAM blocks, programmable read-only memory, and the like. Memory 1009 can include other types of memory as well or combinations thereof.

A user can interact with the computing device 1010 through a visual display device 1028, such as a computer monitor, which can display one or more user interfaces 1030 that can be provided in accordance with exemplary embodiments. The computing device 1010 can include other I/O devices for receiving input from a user, for example, a keyboard or any suitable multi-point touch interface 1018, or a pointing device 1020 (e.g., a mouse). The keyboard 1018 and the pointing device 1020 can be coupled to the visual display device 1028. The computing device 1010 can include other suitable conventional I/O peripherals.

The computing device 1010 can also include one or more storage devices 1034, such as a hard-drive, CD-ROM, or other computer readable media, for storing data and computer-readable instructions and/or software that perform operations disclosed herein. Exemplary storage device 1034 can also store one or more databases 1036 (e.g., image recognition database 110 and/or sorted object database 140) for storing any suitable information required to implement exemplary embodiments. The databases 1036 can be updated manually or automatically at any suitable time to add, delete, and/or update one or more items in the databases.

The computing device 1010 can include a network interface 1022 configured to interface via one or more network devices 1032 with one or more networks, for example, Local Area Network (LAN), Wide Area Network (WAN) or the Internet through a variety of connections including, but not limited to, standard telephone lines, LAN or WAN links (for example, 802.11, T1, T6, 56 kb, X.25), broadband connections (for example, ISDN, Frame Relay, ATM), wireless connections, controller area network (CAN), or some combination of any or all of the above. The network interface 1022 can include a built-in network adapter, network interface card, PCMCIA network card, card bus network adapter, wireless network adapter, USB network adapter, modem or any other device suitable for interfacing the computing device 1010 to any type of network capable of communication and performing the operations described herein. Moreover, the computing device 1010 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 1010 can run any operating system 1026, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 1026 can be run in native mode or emulated mode. In an exemplary embodiment, the operating system 1026 can be run on one or more cloud machine instances.

The above description has been presented to enable a person skilled in the art to create and use a computer system configuration and related method and article of manufacture to recognize images based on multiple contextual factors. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A method for determining atmospheric conditions from an image, the method comprising:
   identifying a set of pixels surrounding a horizon depicted in an image frame, the set of pixels including a plurality of rows in a first subset of pixels above the horizon in the image frame and a plurality of rows in a second subset of pixels below the horizon in the image frame;
   determining an intensity value for each pixel in the set of pixels;
   calculating an average of the intensity values for each of a specified number of rows of the pixels in the first subset and an average of the intensity values of the pixels for each of the specified number of rows of the pixels in the second subset;

determining a first slope of the averages calculated for the first subset;

determining a second slope of the averages calculated for the second subset; and calculating a difference between the first slope and the second slope to determine atmospheric conditions.

2. The method of claim 1, wherein the image frame is a multispectral image.

3. The method of claim 2, wherein the set of pixels are from a red spectral band.

4. The method of claim 2, wherein the set of pixels are from a blue spectral band.

5. The method of claim 1, wherein the first subset of pixels includes at least six rows of pixels above the horizon and the second subset of pixels includes at least six rows of pixels below the horizon, and the first slope and second slope are calculated without using the average for the respective rows closest to the horizon in the first subset and second subset.

6. The method of claim 1, wherein the first subset and second subset have a horizontal extent of five columns of pixels.

7. The method of claim 1, wherein the atmospheric conditions include atmospheric humidity.

8. A system for determining atmospheric conditions from an image on a mobile host platform, the system comprising:

at least one imaging sensor;

a memory;

one or more processors in communication with the memory, the one or more processors configured to:

identify a set of pixels surrounding a horizon depicted in an image frame, the set of pixels including a plurality of rows in a first subset of pixels above the horizon in the image frame and a plurality of rows in a second subset of pixels below the horizon in the image frame;

determine an intensity value for each pixel in the set of pixels;

calculate an average of the intensity values for each of a specified number of rows of the pixels in the first subset and an average of the intensity values of the pixels for each of the specified number of rows of the pixels in the second subset;

determine a first slope of the averages calculated for the first subset;

determining a second slope of the averages calculated for the second subset; and calculate a difference between the first slope and the second slope to determine atmospheric conditions.

9. The system of claim 8, wherein the image frame is a multispectral image.

10. The system of claim 9, wherein the set of pixels are from a red spectral band.

11. The system of claim 9, wherein the set of pixels are from a blue spectral band.

12. The system of claim 8, wherein the first subset of pixels includes at least six rows of pixels above the horizon and the second subset of pixels includes at least six rows of pixels below the horizon, and the first slope and second slope of the averages are calculated without using the average for the respective rows closest to the horizon in the first subset and second subset.

13. The system of claim 8, wherein the first subset and second subset have a horizontal extent of five columns of pixels.

14. The system of claim 8, wherein the atmospheric conditions include atmospheric humidity.

15. A non-transitory computer readable medium storing instructions executable by a processing device, the instructions implementing a method for determining atmospheric conditions from an image, execution of the instructions causes the processing device to:

identify a set of pixels surrounding a horizon depicted in an image frame, the set of pixels including a plurality of rows in a first subset of pixels above the horizon in the image frame and a plurality of rows in a second subset of pixels below the horizon in the image frame;

determine an intensity value for each pixel in the set of pixels;

calculate an average of the intensity values for each of a specified number of rows of the pixels in the first subset and an average of the intensity values of the pixels for each of the specified number of rows of the pixels in the second subset;

determine a first slope of the averages calculated for the first subset;

determine a second slope of the averages calculated for the second subset; and calculate a difference between the first slope and the second slope to determine atmospheric conditions.

16. The non-transitory medium of claim 15, wherein the image frame is a multispectral image.

17. The non-transitory medium of claim 16, wherein the set of pixels are from a red spectral band.

18. The non-transitory medium of claim 16, wherein the set of pixels are from a blue spectral band.

19. The non-transitory medium of claim 15, wherein the first subset of pixels includes at least six rows of pixels above the horizon and the second subset of pixels includes at least six rows of pixels below the horizon, and the first slope and second slope are calculated without using the average for the respective rows closest to the horizon in the first subset and second subset.

20. The non-transitory medium of claim 15, wherein the first subset and second subset have a horizontal extent of five columns of pixels.

* * * * *